United States Patent
Yu et al.

(10) Patent No.: US 10,956,521 B1
(45) Date of Patent: Mar. 23, 2021

(54) COMPUTER PROCESS FOR DIVERSIFIED RANDOM WALK OF A DIRECTED GRAPH

(71) Applicant: Amazon Technologies, Inc., Seattle, WA (US)

(72) Inventors: Hsiang-Fu Yu, San Jose, CA (US); Ishwar Ramani, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 15/978,938

(22) Filed: May 14, 2018

(51) Int. Cl.
*G06F 16/9535* (2019.01)
*G06F 16/901* (2019.01)
*G06F 16/2457* (2019.01)
*G06Q 30/06* (2012.01)

(52) U.S. Cl.
CPC .... *G06F 16/9535* (2019.01); *G06F 16/24578* (2019.01); *G06F 16/9024* (2019.01); *G06Q 30/0631* (2013.01)

(58) Field of Classification Search
CPC ........... G06F 16/24578; G06F 16/9024; G06F 16/95; G06F 16/9535; G06F 16/9538; G06F 16/954; G06Q 30/0631; G06Q 30/0643
See application file for complete search history.

(56) References Cited

U.S. PATENT DOCUMENTS

| | | | |
|---|---|---|---|
| 7,542,951 B1 | 6/2009 | Chakrabarti | |
| 7,945,565 B2 * | 5/2011 | Poblete | G06F 16/9024 707/722 |
| 7,970,664 B2 | 6/2011 | Linden | |
| 8,271,878 B2 * | 9/2012 | Kane | G06Q 30/02 715/733 |
| 9,070,156 B2 * | 6/2015 | Linden | G06Q 30/0253 |
| 2007/0094067 A1 * | 4/2007 | Kumar | G06Q 30/0204 705/26.2 |
| 2008/0104111 A1 | 5/2008 | Slaney | |
| 2008/0243637 A1 | 10/2008 | Chan | |
| 2008/0294617 A1 | 11/2008 | Chakrabarti | |
| 2009/0006398 A1 | 1/2009 | Lam | |

(Continued)

FOREIGN PATENT DOCUMENTS

| | | | | |
|---|---|---|---|---|
| CN | 104376083 A | * | 2/2015 | ......... G06F 16/4387 |
| WO | WO-2013050072 A1 | * | 4/2013 | ......... G06F 16/4387 |

OTHER PUBLICATIONS

Fang et al. Diversified recommendation method combining topic model and random walk. Multimedia Tools and Applications, 77(4), 4355-4378. doi:http://dx.doi.org/10.1007/s11042-017-5504-1 (Year: 2017).*

*Primary Examiner* — James E Richardson
(74) *Attorney, Agent, or Firm* — Knobbe, Martens, Olson & Bear, LLP

(57) ABSTRACT

Systems and methods presented herein create a graph of data within a data set, such as items within an electronic catalog. The nodes of the graph may represent data items, such as items within the electronic catalog. Links or edges can be created between nodes of the graph representative of a data-metric of interest. For example, links or edges can be created between nodes of the graph representative of co-access of items. A diversified page rank process can be performed with respect to a particular node in the graph. This process can use positive or negative bias toward specific attributes to dynamically re-weight edges before and/or during the walk.

19 Claims, 8 Drawing Sheets

(56) References Cited

U.S. PATENT DOCUMENTS

2009/0132459 A1     5/2009  Hicks
2011/0307494 A1 *  12/2011  Snow ................... G06F 16/951
                                                           707/748
2015/0149484 A1 *   5/2015  Kelley ............... G06Q 30/0631
                                                           707/748

* cited by examiner

COMPUTER PROCESS FOR DIVERSIFIED RANDOM WALK OF A DIRECTED GRAPH

BACKGROUND

Computing systems are sometimes used to process heterogeneous data sets. This processing can involve determining a relationship between the data of a heterogeneous data set to determine new information or relationships, or to determine an action to perform. With large heterogeneous data sets, it is often necessary to have a lot of available computing resources, a lot of available time to perform the processing, or a combination of both. This requirement for time or computing resources makes some calculations impracticable, and some may be infeasible to perform in real time or on a large scale.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof. Although certain ones of the drawings depict grayscale images, the original color present in these images is addressed in certain portions of the description.

DETAILED DESCRIPTION

Introduction

Figure 1:
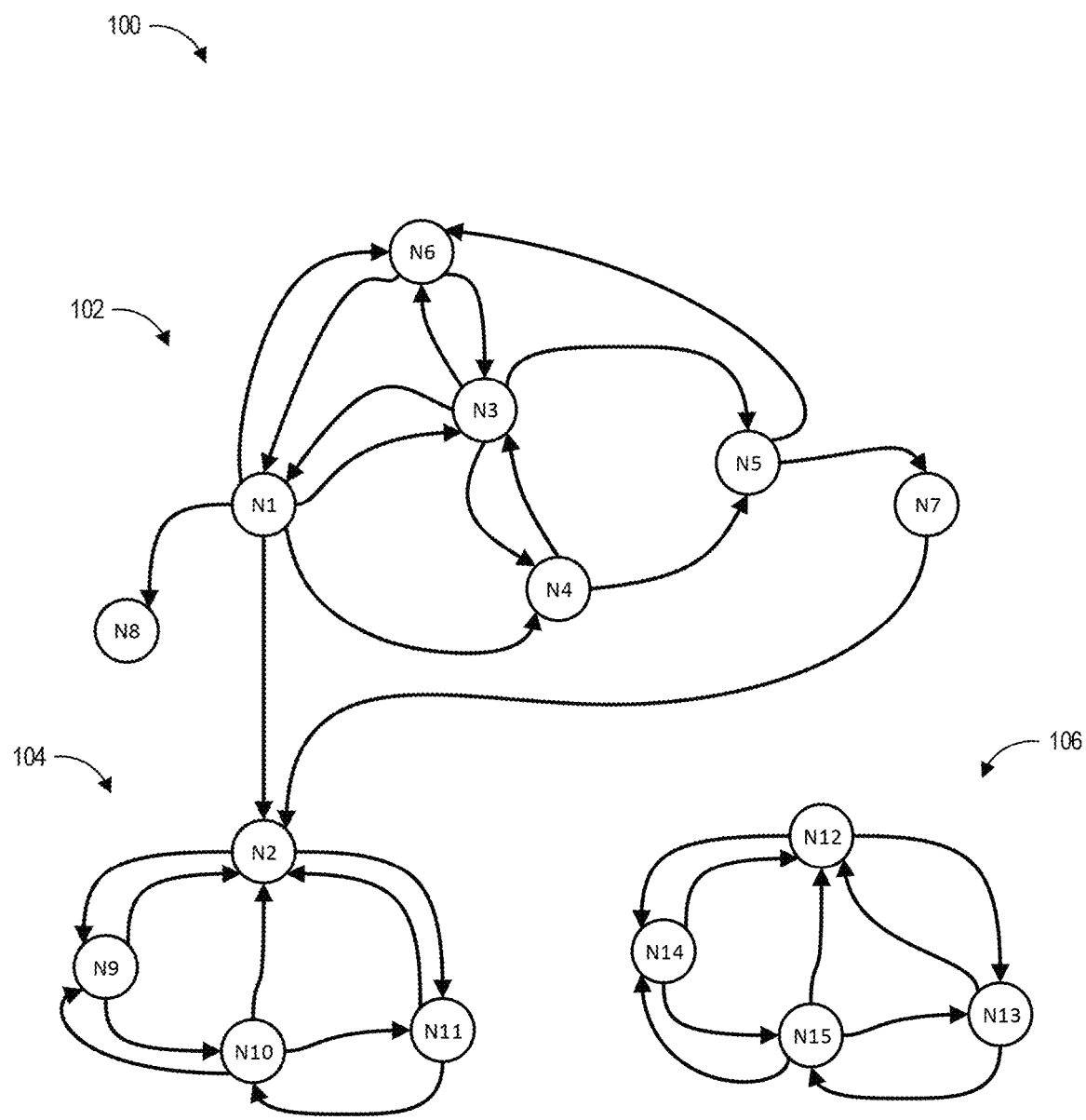
FIG. 1 illustrates an example graph of data items in accordance with embodiments of the present disclosure.

The present disclosure generally relates to techniques for analyzing a collection of items to generate recommendations, where such techniques can be leveraged to either exploit a user's interest in a set of attributes by surfacing items having those attributes, or to promote exploration of new items by surfacing items having diverse attributes. Specifically, the disclosed technology operates on a graph-based representation of relationships between the collection of items. In graph theory, a graph is a data structure in which nodes (in the present disclosure, each node represents a different item, such as a catalog item) are connected by edges. The edges can be directed, meaning that the edge only travels in one direction (e.g., from node A to node B, but not from node B to node A). Such graphs can be explored through a process referred to as a random walk, which is an iterative process that starts from a certain node, then at each time step either follows a random outgoing edge or jumps to a random node. In some variations of the random walk, jumps are limited to a given set of starting nodes. These processes can be used to generate a probability distribution of nodes visited during the random walk, and this probability distribution can be used to select items for recommendation, for example items associated with vertices having the highest probabilities.

However, existing random walks of the graph can result in repetitive recommendations as a user browses a set of content pages for different items. The disclosed technology uses an awareness of context in order to modify the random walk to either focus on something that interests the user or promote an exploratory experience of different types of items. The context can include a user's browsing history and/or the previously-visited nodes in the random walk. For example, a bias generated from the history can be used to reweight edges of the graph, thus affecting the probabilities that the connected nodes will be visited during the random walk. This bias can be positive or negative, and can be determined for individual item attributes. This modification of the random walk can generate tunable recommendations that help with diversity of displayed recommendations and discovery of new types of items.

Overview of Certain Technical Benefits

One example of a heterogeneous data set is an electronic catalog of items. It is often useful to establish relationships between items of the electronic catalog. For example, understanding relationships between items in the electronic catalog can be useful for maintaining item inventory or for generating recommendations of items to users. One method that may be used to establish relationships between items in an electronic catalog is to determine behavior-based associations between items represented in the electronic catalog. For example, the purchase histories or item viewing histories of users can be analyzed to detect behavior-based associations between particular items represented in an electronic catalog (for example, items A and B are related because a users who purchase A also tend to purchase B). As another example, the page browsing histories of users can be analyzed to identify behavior-based associations between particular network-accessible sites, interfaces and/or pages. These types of item relationships can be used to construct a graph representation of the item catalog, with edge locations, directions, and weights based on the pairwise item relationships.

For large electronic catalogs (e.g., catalogs with over 1000, over 10,000, or over 1,000,000 catalog items) that are accessed by many users (e.g., over 100,000, over 1,000,000 or over 10,000,000 unique users), determining the relationship between the items in the electronic catalog can require significant computer processing resources. For example, determining which items have pairwise similarity can involve analyzing the actions of thousands or millions of users with respect to thousands or millions of items, with such actions potentially spanning multiple years. The user actions can indicate which items are typically viewed together (view-based similarity), purchased together (purchase-based similarity), which item a user views after viewing another item, or other types of pairwise item relationships. These types of item to item relationships can be encoded in a graph structure by using vertices to represent the different items, and by constructing edges representing which items users interact with after interacting with another item. These edges can optionally be weighted based on a conditional probability distribution based on prior user access data.

However, such graph structures are computationally expensive to create, as they can involve analyzing the behaviors of millions of different users with respect to millions of different items. Further, the structure of the graph represents item relationships across a general population of users, and may not accurately model the preferences of any given individual user. However, due to the computing resources and volume of interactions required to create the graph, it may not be feasible to create a different graph for each user. Further, it may not be feasible to update such a graph in real time, that is, as users are interacting with different items, in order to account for temporal trends in user behaviors.

Predominantly, recommendations generated by random walks of such graphs are focused on the immediate context. For example, purchase-based recommendations on an item detail page (e.g., a network page presenting details about a particular item) are focused on that particular item. Similarly, recommendations that are presented after a user adds an item to their electronic shopping cart are strongly influenced by the item just added the cart. This approach can work very well for users who are looking for a specific type of item with a clear intent, however it can cause challenges for users that take a browsing approach to locating items.

For example, recommendations can get repetitive because they tend to reinforce the context of a group of items. For example, a user who is shopping for headphones may be repeatedly shown more of variations of headphones as they visit detail pages of headphones, as well as visit other pages. Solutions which try to address this problem typically focus on evaluating the entire world of candidates to either exploit relevance, or to explore along other dimensions (e.g., sets of item attributes). For example, recommendations generated based on a view or purchase of purple rain boots can show other rain boots, but can also be diversified with respect to color to show purple umbrellas, and can be diversified with respect to category to show rain coats. While these approaches are possible, there is a challenge of scale. For a catalog with millions of items, such global candidate evaluation approaches are very computationally expensive to rank for relevance and diversity. Other solutions also use a blending approach to address the scaling problem. For example, one blending strategy can be focused on relevance, and another blending strategy can be focused on some invariant like best sellers or new additions in a category. However, these blending approaches present challenges of not being tunable—that is, the recommendation system does not have a direct control over the different strategies.

These challenges, among others, are addressed in some embodiments by the disclosed techniques for diversifying recommendations generated by a random walk of a graph. The disclosed techniques can use a bias to reweight edges of the graph in order to influence the nodes visited during the random walk. This can be controlled to either positively or negatively bias the random walk towards individual attributes. Beneficially, this biasing can be performed in real time (e.g., as the user is navigating pages within the electronic catalog) to leverage the pre-computed item graph for personalized, context-aware recommendations. Further, the biasing can be tuned individually with respect to certain item attributes. As a result of the biasing, users can be presented with recommendations that either exploit attributes in which the user is interested or explore attributes to provide a more diverse recommendations set.

The task of navigating a large electronic catalog of items (e.g., a catalog with over one thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

Recommendation algorithms and user interfaces of the type disclosed herein significantly reduce this problem, allowing users to locate items of interest with fewer steps. For example, in the embodiments described herein, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult.

Example Item Graph

FIG. 1 illustrates an example graph 100 of data items in accordance with embodiments of the present disclosure. Although not limited as such, the nodes in the graph 100 may represent items included in an electronic catalog. Each of the edges in the graph 100 may be created based on a determination that a pair of items corresponding to two nodes in the graph has been co-accessed by a user or by threshold number of users. Alternatively, or additionally, the edges may represent that a user who took an action with respect to item X corresponding to a first node in the graph then took an action with respect to item Y corresponding to a second node in the graph connected by an edge. In some embodiments, edges are created between nodes corresponding to items that have an above threshold probability of being co-accessed. Although some item may have been co-accessed, if the conditional probability that a user who accesses one item would access another item is below a threshold, then an edge may not be created between the corresponding nodes.

Further, in some cases, the edges may be directional, which may indicate a time ordering of the access of items corresponding to the nodes. For example, the edge between node N1 and node N3 may indicate that a user, or threshold number of users, that accessed an item corresponding to the node N1 accessed the item corresponding to the node N3 within a threshold period of time. Typically the edges are not bi-directional because it is often the case that an access of a first item may be associated with a high probability of access of a second item, but the reverse may not be true. For example, there may be a high probability that a user who accesses a television will access batteries (e.g., for the remote control), but there is not a high probability that a user who accesses batteries will then purchase a television.

Further, in cases where some users accessed a first item before accessing a second item and some users accessed the second item before accessing the first item, two directed edges pointing in opposite directions may exist between the corresponding nodes. For example, the nodes N3 and N6 have both a directed edge pointing from N3 to N6 and a directed edge pointing from N6 to N3.

Each of the nodes connected to a particular node may correspond to an item that may potentially be recommended to an item corresponding to the particular node. For example, if the user accesses the item corresponding to the node N1, one or more of the items corresponding to the nodes N2, N3, N4, N6, or N8 may be recommended. However, some of the items may be poor recommendations and may only be coincidentally linked. For example, if some users happen to purchase a toy and a lawn mower, the two items may become linked in the graph, but a user who accesses a toy is not necessarily interested in a lawn mower. In some cases, the items may have related uses, but may not be indicative of whether an item recommendation is relevant. For example, batteries and televisions may be related within the graph 100 because users who purchase televisions may purchase batteries for the remote control at the same time. However, batteries have many other uses and a user accessing an item detail page for batteries is not necessarily interested in recommendations for televisions.

To eliminate or reduce the poor recommendations, the number of paths that connect a pair of items can be evaluated. Items that are selected for recommendation will likely serve as recommendations for each other and likely will have previously been co-accessed as well. For example, if nodes N1, N3, N4, and N6 each correspond to different pairs of jeans, it is likely that any combination of the items may have previously been co-accessed. Thus, there are several pathways between the nodes. However, if node N2 is a cell phone case it is unlikely to have many paths to the group of nodes corresponding to the pairs of jeans, but it may be linked to other cell phone products, which may be represented by nodes N9, N10, and N11. Using the processes described herein, the item associated with the node N8 may be removed from a set of potential items to recommend to a user who accesses the item associated with the node N1 because the number of paths to the node N8 is relatively few compared to the number of paths to, for example, the item corresponding to the node N5.

In some embodiments, not all items within an electronic catalog may be connected within the graph. For example, if some items are never co-accessed with some other items, edges may not exist between all the items. Thus, the graph 100 may include some nodes that are interconnected because they may be co-accessed, but which have no edges or paths to some other nodes. For example, nodes N12, N13, N14, and N15 may have edges between each other because corresponding items may be co-accessed by some users. However, as these items may not be co-accessed with other items in the graph 100, there is no edge or path to the other nodes, such as N11. In other words, the graph 100 may include several sub-graphs. Some of the sub-graphs may be connected to other sub-graphs as the illustrated by sub-graph 102 and 104. Other sub-graphs, such as sub-graph 106 may not be connected to the sub-graphs 102 and 104.

Example Networked Computing Environment

Figure 2:
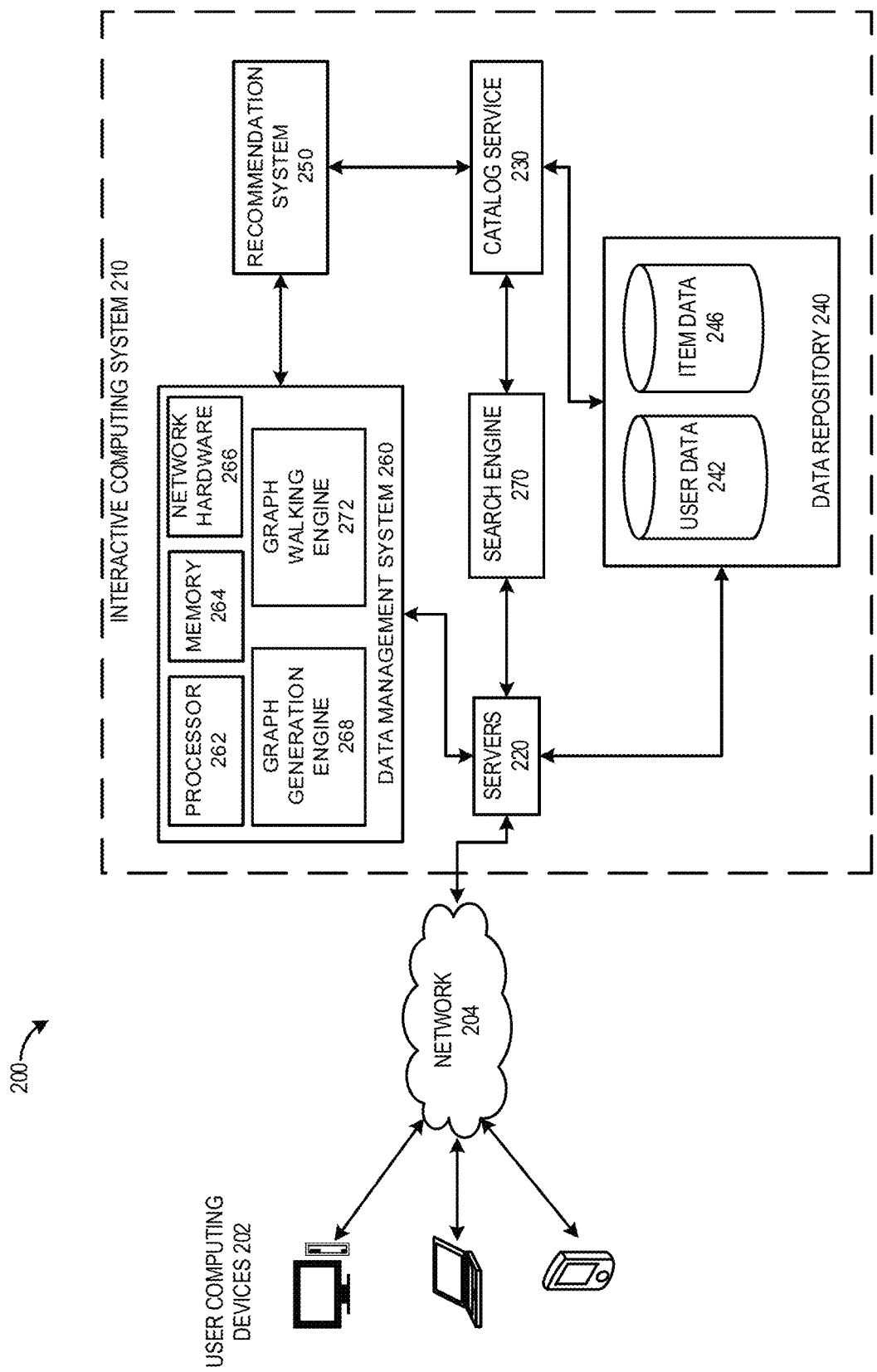
FIG. 2 illustrates an embodiment of a networked computing environment including an interactive computing system.

FIG. 2 illustrates an embodiment of a networked computing environment 200 including an interactive computing system 210. The interactive computing system 210 can, in some cases, implement a network application, such as a software application or website, for providing users with access to items. In some embodiments, the interactive computing system 210 may process item access data provided by external network sites or third-party organizations. In some embodiments, the interactive computing system 210 is associated with a network or Internet-based store or retailer. For example, the interactive computing system 210 may be part of an ecommerce site. In some cases, the interactive computing system 210 may be associated with an Internet-based store that is affiliated with a brick-and-mortar store or retailer.

In certain embodiments, the interactive computing system 210 can send to a user system 202 a user interface (e.g., a web page or mobile application interface) for presentation via the user system to a user. In response, the interactive computing system 210 can receive data associated with a user's interaction with the user interface from the user system 202. This interaction data may include item access data, such as the viewing of an item-detail page associated with an item, the addition of the item to a shopping cart, or the purchase of an item. Further, the interaction data may indicate co-access information. This co-access information may identify additional items that are accessed with an item or within a threshold time period of accessing the item. As described in more detail below, the interaction data can be used to identify a context for the disclosed diversified random walk and/or to generate a bias for the diversified random walk. The user interface may include recommendations for particular items. These recommendations may be generated based on particular items that a user accessed, for example using the recommendation process of FIG. 4.

The interactive computing system 210 can include a number of systems that facilitate implementing the processes described herein. These systems may be implemented in hardware. For instance, the interactive computing system 210 can include one or more servers 220, which may be implemented in hardware, for receiving and responding to network requests from the user systems 202. However, some of the capabilities of the servers 220 may be implemented in software. The one or more servers 220 can include a variety of different server types including network servers, web servers, application servers, database servers, and combinations of the same, or the like. Although the interactive computing system 210 may include one or more servers 220, the present disclosure is not limited for use with systems that employ a client/server architecture. A computing architecture that enables users to obtain item recommendations and to filter noise from the recommendations may implement the present disclosure.

Further, the interactive computing system 210 may include a search engine 270, which may be implemented in hardware and/or a combination of hardware and software. The search engine 270 can include any system for searching an electronic catalog. For example, the search engine 270 can search an electronic catalog provided by the catalog service 230. Both the search engine 270 and the catalog service 230 may be in communication with one or more of the servers 220. Users can browse the electronic catalog provided by the catalog service 230 or query the search engine 270 to obtain information about electronic catalog content stored in an item data repository 246.

The electronic catalog content can include information about items available for access or purchase by a user. The items may include any type of item and are not limited in type or form. For example, the items may include physical products, digital products, gifts, electronic currency, and/or services. In one embodiment, the content is arranged in a hierarchical structure having items associated with one or more categories or browse nodes in a hierarchy. The catalog service 230 can provide functionality for users to browse the product hierarchy in addition to searching the catalog via the search engine 270.

In some cases, the hierarchical structure can include a tree-like structure with browse nodes that are internal nodes and with browse nodes that are leaf nodes. The internal nodes generally include one or more child or descendent nodes and the leaf nodes generally do not include child nodes. The internal nodes may be associated with an item category or classification, which can include sub-classifications. The sub-classifications may represent additional internal nodes or leaf nodes. The leaf nodes may be associated with an item category or classification that does not include sub-classifications. In some implementations, the internal nodes are associated with item classifications and sub-classifications, but not items, and the leaf nodes are associated with the items. In other implementations, both the internal and leaf nodes may be associated with items.

Users can select or access an item represented in the hierarchy, in a list of search results, or in a recommendation set to see more details about the item. In response to a user's item selection, the server 220 can provide to a user system 202 a catalog page (sometimes called an item page or item detail page) that includes details about the selected item. These details may include an item title, item specifications, manufacturer-provided content, user reviews, and the like.

The interactive computing system 210 also includes a recommendation system 250. The recommendation system 250 can use the graph walking engine 272 to identify one or more items to recommend to a user (referred to as recommendation sets). The recommendation system 250 can determine recommend items in response to a user accessing an item detail page for an item, adding an item to a digital shopping cart, or in response to other triggering events.

The interactive computing system 210 further includes a data management system 260. The data management system 260 is configured for managing large quantities of data, such as data associated with an electronic catalog. The data management system 260 is implemented in computer hardware (optionally in combination with computer software), including one or more processors 262 and one or more data storage elements 264. In addition, the data management system 260 may include one or more volatile memory elements, such as random-access memory (RAM). Moreover, the data management system 260 may include network hardware 266 for communicating with a network 204, a local area network, or other computing systems within the interactive computing system 210.

In addition, the data management system 260 includes a graph generation engine 268 and a graph walking engine 272. The graph generation engine 268 is configured for creating a graph representative of a set of heterogeneous data, such as the example graph 100 of FIG. 1, for example using the techniques described with respect to FIG. 3. As one example, the graph generation engine 268 may create a graph of item relationships for the items represented in an electronic catalog provided by catalog service 230. The graph walking engine 272 is configured for performing random walks of such a graph, for example using the diversified random walk techniques described with respect to FIG. 4.

Further, the interactive computing system 210 may include a data repository system 240. The data repository system 240 can generally include any repository, database, or information storage system that can store information associated with items and users. As illustrated in FIG. 2, the data repository 240 can include a user data repository 242 and an item data repository 246. Although illustrated as separate repositories, in some cases the repositories may be combined. Further, in some cases, the repositories may be implemented on one or multiple computing systems.

The user data repository 242 comprises one or more physical data storage devices that stores data representing information associated with a user including account information, user purchase information, user demographic data, item view information, user searches, identity of items owned by a user (e.g., purchased or obtained as a gift), and the like. In some cases, the user data repository 242 may store relationships between users based on similarities in item purchase profiles.

The item data repository 246 comprises one or more physical data storage devices that stores data representing any information associated with an item. For example, the item data repository 246 can store item attributes, item descriptions, customer reviews, item tags, manufacturer comments, etc. Further, the item data repository 246 can store item categorization information for an item. As used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system. Further, the term "item" is not limited and may include physical products, digital products, services, electronic currency, gifts, etc. Moreover, the term "access" may refer to any interaction with an item. For example, access may include purchasing the item, viewing the item, viewing an item-detail page associated with the item, adding an item to a shopping cart, adding the item to a wish list, adding the item to a registry, downloading information associated with the item, or otherwise indicating an interest in an item.

Item attributes represent characteristics of items, for example category (or node in an item hierarchy), brand, target age-range (e.g., baby, child, adult), color, price, keywords, user ratings, delivery timeframe, product origin, and other item attributes presented herein, to name a few non-limiting examples. For instance, if the item is a piece of clothing, the attributes may include brand, style, color, pattern, and fabric, among others. These examples present item attributes that have specific meaning to human users. Item attributes can also include engineered attributes generated, for example, by machine learning analysis of the items. Engineered attributes may represent combinations and/or degrees of other item characteristics that have been identified by a machine learning system as significant across the item set. While engineered attributes may not be exposed to users, as they may not have any conventionally understood meaning, they nevertheless can be useful for identifying items responsive to search queries and/or for recommendation.

Users may interact with the interactive computing system 210 via one or more user systems 202. The user systems 202 may include hardware and software components for establishing communications over a communication network 204. For example, the user systems 202 may be equipped with networking equipment and network software applications (e.g., a web browser) that facilitate communications via a network (e.g., the Internet) or an intranet. The user systems 202 may have varied local computing resources such as central processing units and architectures, memory, mass storage, graphics processing units, communication network availability and bandwidth, etc. Further, the user systems 202 may include any type of computing system. For example, the user systems 202 may include any type of computing device(s), such as desktops, laptops, video game platforms, television set-top boxes, televisions (e.g., internet TVs), network-enabled kiosks, computerized appliances, wearable devices (e.g., smart watches and glasses with computing functionality), and wireless mobile devices (e.g., smart phones, PDAs, tablets, or the like), to name a few.

The network 204 can include any type of communication network. For example, the network 204 can include one or more of a wide area network (WAN), a local area network (LAN), a cellular network, an ad hoc network, a satellite network, a wired network, a wireless network, etc. Further, in some cases, the network 204 can include the Internet.

Example Item Graph Creation Process

Figure 3:
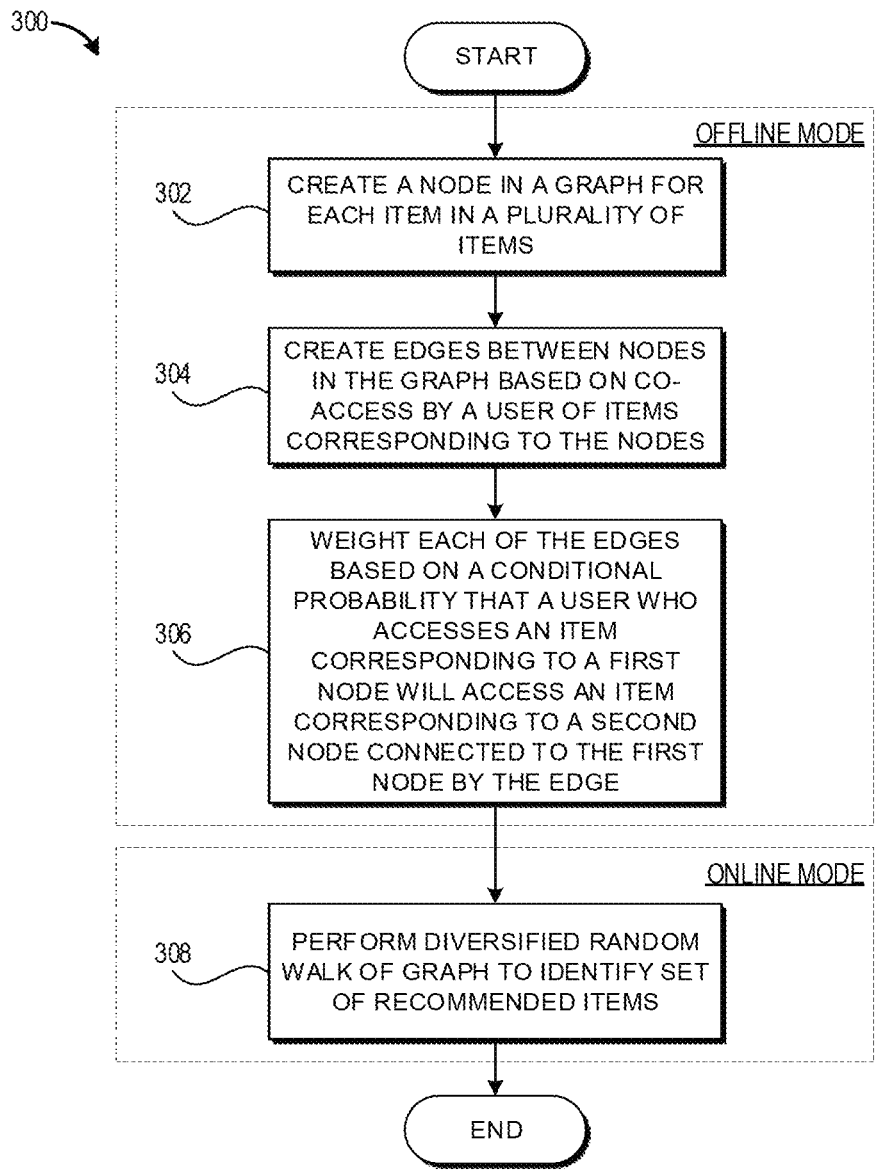
FIG. 3 presents a flowchart of an embodiment of an item graph creation and random walk process.

FIG. 3 presents a flowchart of an embodiment of a process 300 for creating and using an item graph. The process 300 can be implemented by the data management system 260, as well as other suitable systems. Although any number of systems, in whole or in part, can implement the process 300, to simplify the discussion, the process 300 will be described with respect to the particular systems shown in FIG. 2.

When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

The process 300 begins at block 302 where, for example, the graph creation engine 268 creates a node in a graph for each item in a plurality of items. The plurality of items may be items included in an electronic catalog provided by the catalog service 230. Each node within the graph may correspond to a different item within the electronic catalog. In some embodiments, nodes within the graph may be representative of a plurality of items. For example, each node within the graph may correspond to an item category.

At block 304, the graph creation engine 268 creates edges between nodes in the graph based on co-access by a user of items corresponding to the nodes. Each of the edges may be directed edges with the tail of the edge corresponding to the earlier item accessed and the head of the edge corresponding to the later item accessed. In other words, the directed edge between the nodes may indicate that a user who accessed the item corresponding to the tail of the edge subsequently accessed the item corresponding to the head of the edge. In certain embodiments, the edges are created for nodes in the graph corresponding to pairs of items that a threshold number of users co-accessed. For example, if the threshold number of users is 50, an edge is created between two nodes representing two items that are co-accessed by at least 50 users. In some embodiments, co-accessed items may include pairs of items that are accessed within a threshold time period of each other. For example, items that are accessed within the same transaction, within the same browsing session, or within a certain number of minutes of each other may be considered co-accessed items.

At block 306, the graph creation engine 268 assigns or calculates weights to each of the edges based on a conditional probability that a user who accesses an item corresponding to a first node will access an item corresponding to a second node that is connected to the first node by the edge. In some embodiments, the weight may differ based on how closely in time the two items are accessed. If for a particular user the amount of time between accesses of the two items exceeds a threshold, there may be little or no contribution to the calculated weight from the user's access.

In certain embodiments, the weight applied to each edge indicates how often a user who buys or accesses an item corresponding to the node at the tail of the edge also buys or accesses the item corresponding to the node at the head of the edge. Alternatively, or in addition, the weights calculated for each edge may be based at least in part on a similarity score generated for the pair of items based on a calculation of how similar the items are. The item similarity may be determined based at least in part on a similarity of characteristics of the items. For example, items that share a purpose, appearance, or cost may be associated with a higher similarity score than items that do not share such characteristics.

At block 308, the graph walking engine 272 performs a diversified random walk of the graph to identify a set of recommended items. Generally described, the objective of a random walk is to rank the nodes in the graph based on the edge locations, directions, and weights. This is accomplished by having a "random walker" navigate the graph. The walk begins at a certain node, and then each subsequent node is visited by traversing the outgoing links, which are selected at random. After some n iterations the random walking stops and the process looks at the distribution of nodes visited by the random walker.

One example of a random walk technique is the page rank algorithm. Page rank returns the global rank for a given graph. In a variation termed personalized page rank, the ranking is biased based on a start node (e.g., the node corresponding to a particular item in which a user has expressed interest). When applied to a graph with edge weights, the weights affect the likelihood that a given edge will be selected over other available edges, where higher weights yield greater probabilities for edge selection. However, these page rank algorithms compute probabilities that nodes will be visited based on static edge weights, with such weights generated based on aggregate user actions. As such, these random walk techniques are not adaptable to user preferences with respect to particular item attributes, nor can they bias resulting recommendations to account for recent user behavioral patterns (e.g., a clickstream of pages visited during current browsing session).

As described above, the diversified random walk addresses these challenges by incorporating parameters for tuning bias with respect to individual item attributes, and parameters for retaining a sense of the "path" of nodes the random walker has already visited. These parameters enable the diversified random walk to bias towards or away from specific item attributes, and also to identify recommendation sets with both high relevance and interesting diversity. The diversified random walk is described in greater detail with respect to FIG. 4.

As illustrated in FIG. 3, blocks 302, 304, and 306 of the process 300 can be performed in an offline mode. As used herein, "offline" or "offline mode" refers to processing operations relating to data and/or calculations that are pre-computed, that is, performed in advance of an event that may trigger a diversified random walk as described herein. The offline portion of the process 300 may be performed once or multiple times. In some embodiments, the process 300 may be performed each time there is a change to the data set. For example, the offline portion process 300 may be performed each time an item is added or removed from the electronic catalog of a catalog service 230. In some embodiments, the offline portion process 300 may be performed according to a schedule, such as on a nightly basis, a weekly basis, a weekday basis, a weekend basis, or during any other scheduled time period. Further, the offline portion process 300 may be performed in response to a command from a user, such as administrator.

As illustrated in FIG. 3, block 308 of the process 300 can be performed in an online mode. As used herein, "online" or "online mode" refers to processing operations performed as a user is currently interacting with a networked system such as an electronic catalog. The generated recommendation user interfaces can be provided to users in "real time." For example, a user interface provided in real time can be generated and then displayed to a user as the user is interacting with the electronic catalog, such as when the user loads a new item page.

Example Recommendation Generation Process

Figure 4:
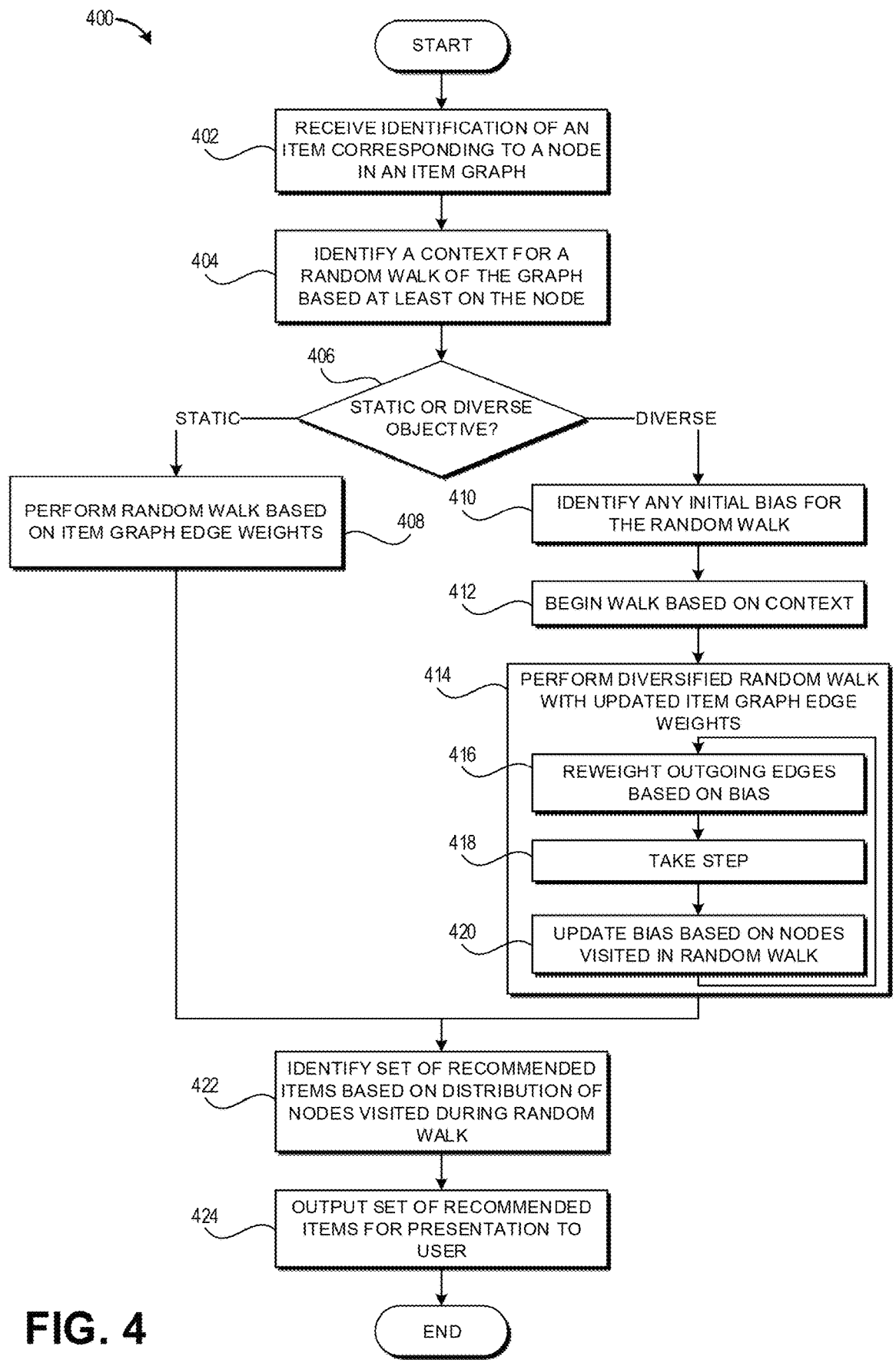
FIG. 4 presents a flowchart of an embodiment of a recommendation generation process using the disclosed diversified random walk techniques.

FIG. 4 presents a flowchart of an embodiment of a recommendation generation process 400 using the disclosed diversified random walk techniques. The process 400 can be implemented by the recommendation system 250 and graph walking engine 272, as well as other suitable systems. Although any number of systems, in whole or in part, can implement the process 400, to simplify discussion, the process 400 will be described with respect to the particular systems shown in FIG. 2.

When the process 400 is initiated, a set of executable program instructions stored on one or more non-transitory computer-readable media (e.g., hard drive, flash memory, removable media, etc.) may be loaded into memory (e.g., random access memory or "RAM") of a server or other computing device. The executable instructions may then be executed by a hardware-based computer processor (e.g., a central processing unit or "CPU") of the computing device. In some embodiments, the process 400 or portions thereof may be implemented on multiple computing devices and/or multiple processors, serially or in parallel.

The process 400 begins at block 402 where, for example, the recommendation system 250 receives an identification of an item corresponding to a node in an item graph. This item graph may include the graph of an electronic catalog and may be created using, for example, the process 300. The item identified at the block 402 may be referred to as a "source item" and the corresponding node may be referred to as a "source node." For example, the source item may be the item of a detail page the user is currently viewing or has just selected to view. The source item may be an item the user has just added to their digital shopping cart. In some implementations, the source item may be an item the user has previously accessed but not acquired (e.g., purchased, rented, streamed), or may be a new item in the catalog. The recommendation system 250 can then communicate with the graph walking engine 272 to initiate the graph walking process used for identifying a recommendation set.

At block 404, the graph walking engine 272 can identify a context for the random walk of the graph based at least partly on the source node. A random walk typically involves multiple random walks (e.g., hundreds or thousands), and the resulting node distribution can reflect the nodes visited in each of the walks. The context refers to the set of nodes that are used as candidates for starting the walk, and optionally during the walk the random walker may have a probability of jumping back to this set of nodes. In some implementations, the context includes just the source node, and thus each random walk would begin at the source node. In some implementations, the context includes a number of nodes including the source node, with these nodes reflecting items in the user's access history (e.g., recently visited item detail pages, recent purchases). The recently visited item detail pages may form a "clickstream," for example a sequence of pages visited by the user selecting presented navigational options that direct the user to other pages. This can occur, for example, when the user views a first detail page of a first item, then selects a navigational option presented on the first detail page that leads to a second detail page of a second item recommended based on the first item, then selects a navigational option presented on the second detail page that leads to a third detail page of a third item recommended based on the second item, and so on. In these implementations, each random walk can randomly start from one of the set of nodes. A time decay can be applied such that a given random walk is more likely to start from nodes representing items more recently accessed by the user.

At block 406, the graph walking engine 272 can set an objective parameter of the random walk. For example, the random walk can have a static or diverse objective. A static objective includes a static distribution of candidate recommendations relevant to the context, for example by performing a random walk that selects nodes to visit based on the existing similarity-based (or other co-access-based) edge weights. The graph walking engine 272 may select a static objective if there is little or no information regarding what preferences the user has regarding particular item attributes (e.g., if the user has little or no item access history). A diverse objective involves the disclosed diversified random walk, which selects nodes to visit both as a function of the static distribution but also using a submodular gain or loss for individual item attributes. As an example, a diverse objective can select similar items but bias toward those with different colors compared to those the user has already seen during their current browsing. The graph walking engine 272 may select a diverse objective if user attribute preferences are known, for example from analysis of past user item accesses. However, the graph walking engine 272 can still select the diverse objective even if a user has no associated item access history, as the diverse random walk introduces diversity based on awareness of attributes of items corresponding to previous nodes visited in the random walk.

If the graph walking engine 272 determines to use a static objective, then the process 400 transitions to block 408 at which the graph walking engine 272 performs at least one random walk of the item graph based on the context and the co-access based item graph edge weights (or no weights, if the edges are unweighted). This generates an un-biased set of page rank scores for the visited nodes of the graph, by the aggregated counts of multiple random walks $W^{(s)} = \{v_1 \to v_2 \to \ldots \to v_k\}$ on the given graph. Given the current node $v_t$ and the context $C_t$, the next node $v_{t+1}$ is sampled according to the following probability distribution:

$$\mathbb{P}[[v_{t+1}|v_t,C_t]] \propto f(v_{t+1},v_t,C_t) \tag{1}$$

For personalized page rank with a persona vector p, $f$ is defined as follows, where $A \in \mathbb{R}^{n \times n}$ is the static transition matrix of the graph (e.g., a matrix representing the edge locations and weights):

$$f_{ppr}(v_{t+1},v_t,C_t) = \alpha A_{v_t v_{t+1}} + (1-\alpha) p_{v_{t+1}} \tag{2}$$

where α is a parameter that controls the random walker range, and the persona vector p controls the "home base" for the random walker to start and jump back to, and can be generated based on one item, a purchase history, a set of related items, or so on. After one or more such random walks, the graph walking engine 272 generates a distribution of the visited nodes.

If the graph walking engine 272 determines to use a diverse objective, then the process 400 transitions to block 410 at which the graph walking engine 272 prepares for a diverse random walk by identifying any initial bias. The bias can be built from user purchase history or preferences (e.g., a user may like a certain brand a lot, or may be economical in her purchases). This initial bias can influence the exploitation of these preferences during the random walk, while still exploring the catalog on other attributes or dimensions. Initial bias can also be set to a negative bias, for example if a user has expressed negative sentiment (e.g., low reviews, negative ratings, item returns) regarding a particular attribute, such that the initial bias can influence the random walk away from nodes associated with items having this attribute. In some embodiments block 410 may be optional, or may otherwise result in no initial bias being set.

To illustrate the concept of the initial bias, consider that the user's recent browsing history may include a number of detail pages of shoes. The graph walking engine 272 can generate a histogram of item attributes across these visited detail pages, and can identify that the user is 80% interested in a "pump" style of shoe, 15% interested in a "black" color of shoe, and 5% interested in a "leather" material for the shoe. This can translate to a positive bias towards each of these attributes, with the strength of the bias reflecting the relative interest of the user in each attribute. For example, the graph walking engine 272 can analyze the attributes of items in a history of the user, such as browsing history, purchase history, or a recent clickstream. The attributes of the items can be represented as a histogram indicating the number of times which a given attribute appears in the history. This may include all attributes of the items, or a pre-determined subset of attributes identified for use in random walk bias generation. Some implementations may apply a time decay, such that attributes of items interacted with further in the past are weighted less heavily than attributes of items interacted with more recently.

At block 412, the graph walking engine 272 can begin the random walk based on the context. For example, the random walk process may include traversing the graph starting from the source node, and from there can follow edges from the source node to other nodes within the graph. In other scenarios, the random walk process may begin at another node identified in the context.

At block 414, the graph walking engine 272 can perform the diversified random walk using updated item graph edge weights based on the initial bias and on any bias generated by the walk itself. For the first step, only the initial bias (if calculated) may be used. The bias generated during the walk refers to a histogram of attributes (or the pre-determined subset of attributes) of items associated with nodes already visited during the walk. Another node can be considered to increase diversity of the walk if the attributes associated with that node's item would increase the entropy of the histogram. Outgoing edges can be reweighted according to the walk histogram. Thus, each step can be taken randomly, but biased towards increasing diversity. In addition, the initial weights determined from analysis of user history data can continue to influence the re-weighting at each step. Each step can involve blocks 416, 418, and 420 shown as subroutines of block 414.

At block 416, the graph walking engine 272 can reweight the outgoing edges from the starting node based on the identified attribute-specific bias. For the first step, this bias can be the initial bias calculated at block 410. Returning to the example above, if any of the outgoing edges lead to nodes representing items having pump shoe style, black color, or leather material attributes, those outgoing edges can be reweighted to reflect the positive bias. The reweighting can take into account any weight initially assigned to the edge (e.g., a conditional probability of any given user accessing item B after item A). For example, edges connected to nodes representative of items that are co-accessed more often (e.g., 30%) may be weighted higher than edges connecting to nodes representative of items that are co-purchased less often (e.g., 10%). Further, the graph walking model may include a probability that the graph walking engine 272 should return to a node in the context node set.

At block 418, the graph walking engine 272 causes the random walker to take a step to another node along one of the outgoing edges (or jump to a node in the context node set). For example, starting at a source node, there may be an 85% probability of moving to another node when traversing the graph (factoring in any initial conditional probability and any calculated bias). The particular node selected may be picked at random giving each path its weighting. The selected path will lead to a first hop node of the source node. The process may then be repeated at the first hop node (after cycling through blocks 420 and 416). At the first hop node, the graph walking engine 272 may also consider a probability of returning to the source node (or another node in the context node set), will determine whether to jump to a node, or whether to continue traversing the graph from the first hop node.

At block 420, the graph walking engine 272 can update the bias based on nodes visited during the random walk. For example, the graph walking engine 272 can apply a submodular function to certain item attributes in order to diversify the types of nodes visited throughout the random walk. The graph walking engine 272 can build a histogram of attributes associated with already visited nodes, and can use this histogram to bias the random walk towards a more diverse set of nodes.

Specifically, consider that various attributes of nodes are available such as colors, browse nodes, and brand names. For each attribute, the graph walking engine 272 can consider the histogram of all possible values of this attribute from the context $C_t$, which can be used to change the transition probability to either encourage the exploiting for this attribute or encourage the diversifying for this attribute. As a result, the final $f$ function can be rewritten as follows (where the options for $f_{attr}$ are defined further in equations (5) and (6)).

$$f(v_{t+1}, v_t, C_t) = \sum_{attr} \alpha_{attr} f_{attr}(v_{t+1}, v_t, C_t) \qquad (3)$$

For each attribute, the graph walking engine 272 can define the gain:

$$\sigma_{attr}(C) = \sum_{val} \sigma_{attr,val}(|\{attr(v) = val | v \in C\}|) \qquad (4)$$

where $\sigma_{attr,val}$ can be any submodular function such as log (1+count). Note that the count function can also be replaced by other aggregated functions as long as the final σ remains submodular. The sigma (gain function) defined in Equation (4) is used in Equation (5) to define $f_{attr}$, which is used in Equation (3).

With respect to $f_{attr}$, the graph walking engine 272 can select different equations for this term of the diversified random walk function based on whether a user's bias towards an attribute value is identified as positive or negative. As an example, if the graph walking engine 272 decides to use the random walk to explore an attribute (e.g., using a negative bias away from items with the same attribute value), it can use the following submodular function (or another suitable submodular function):

$$f_{attr}(v_{t+1}, v_t, C_t) = \sigma_{attr}(C_t \cup \{v_{t+1}\}) - \sigma_{attr}(C_t) \quad (5)$$

On the other hand, if the graph walking engine 272 decides to use the random walk to exploit an attribute (e.g., using a positive bias towards items with the same attribute value), it can use the following monotone function (or another suitable monotone or non-decreasing function):

$$f_{attr}(v_{t+1}, v_t, C_t) = \sigma_{attr,val}(|\{attr(v) = val | v \in C\}|) \quad (6)$$

Alternatively, some implementations may use a determinantal point process approach in place of the above-described submodular function.

The process 400 can cycle through blocks 416-420 for each step of the random walk, and as such the walk-related bias can be updated at each step. This can continue until the random walk has concluded. After one or more such random walks, the graph walking engine 272 generates a distribution of the visited nodes.

The process 400 can transition from either block 408 or 414 to block 422. At block 422, the recommendation system 250 identifies a recommendation set based on the distribution of nodes visited during the random walk. In some embodiments, each of the items corresponding to the distribution of nodes may be included in the recommendation. Alternatively, only a subset of the items may be included in the recommendation, for example a top N or percentage of items (based on the distribution). In some embodiments, the recommendation system 250 can filter out certain items, for example items a user has already purchased, or items otherwise identified as unlikely to interest the user.

At block 424 the recommendation system 250 can output the set of recommended items for presentation to the user. For example, one or both of the recommendation system 250 and a user computing device 202 can generate a user interface that presents information about each recommended item and also includes a user-selectable navigational option to visit a detail page associated with each recommended item. User selection of such a navigational option can re-trigger the process 400.

Example Recommendations Sets

FIGS. 5A-5D illustrate example results sets for various recommendation generation techniques. The results sets may be included as part of a user interface generated by a computing system, such as the interactive computing system 210, the recommendation system 250, a server 220, or the user system 202. The user interface can include a navigational shortcut to a detail page for each recommended item, for example a user-selectable link to the detail page embedded in the item name, displayed image of the item, or otherwise provided in association with the depiction of the item.

Figure 5A:
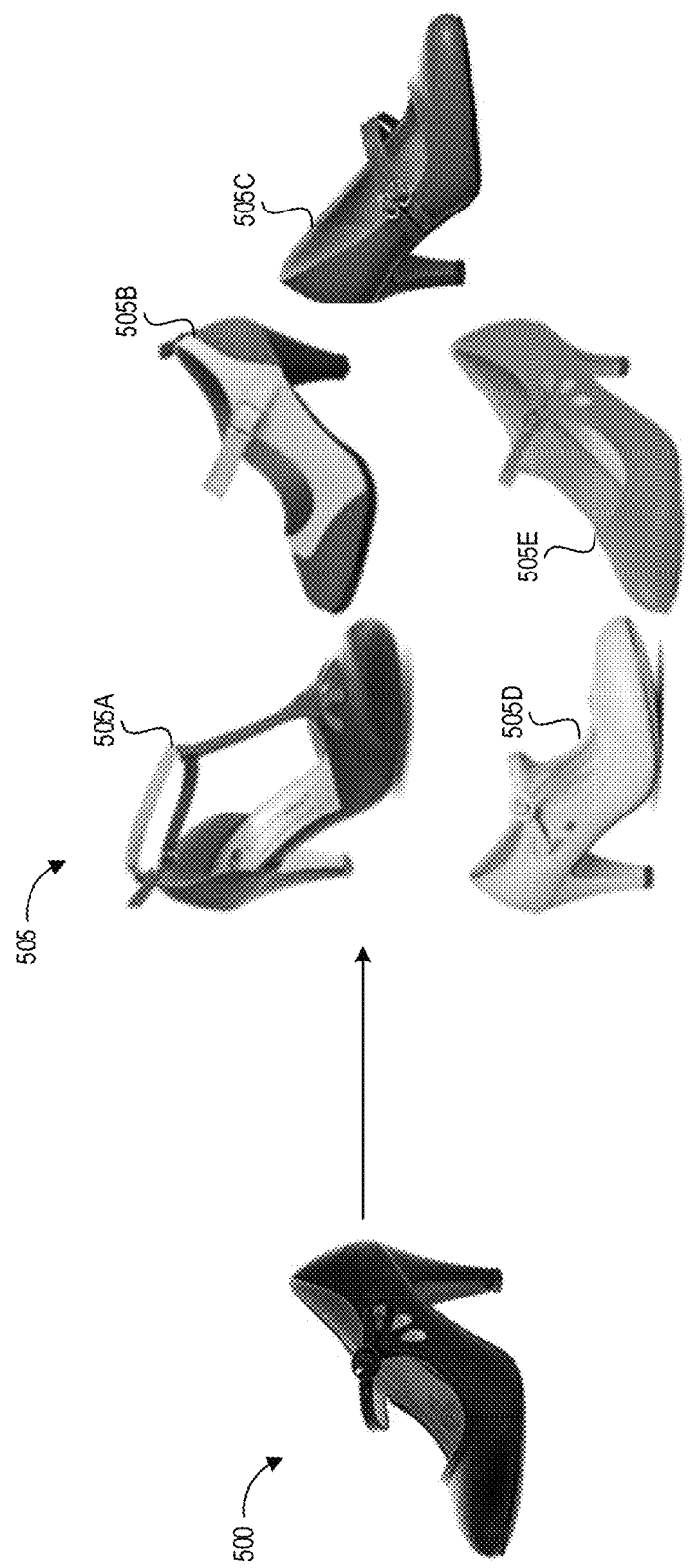
FIG. 5A illustrates an example result set for existing recommendation generation techniques.

Specifically, FIG. 5A illustrates an example set of recommended items 505 generated based on purchase similarities (e.g., where items that are co-purchased are considered to be similar). In the original color image, the source item 500 is black, shoe 505A is navy blue, shoe 505B is white with black accents, shoe 505C is medium brown, shoe 505D is pastel pink, and shoe 505E is bright red. As illustrated, the recommended items 505A-505E are all highly relevant to the source item 500 in that they are all high heeled shoes of a similar style (e.g., closed toe ~2″ heels with ankle straps). Further, two of the recommended items 505D, 505E have the same shape as the source item 505, and only differ in terms of color. If the user selects links to visit the pages for the recommended items 505, this can result in the problem of "stale" recommendations. For example, as the user keeps browsing through these item pages, they are all tied by some context (e.g., closed toe high heeled shoes) so the recommendations presented on these additional item pages tend to repeat themselves.

Figure 5B:
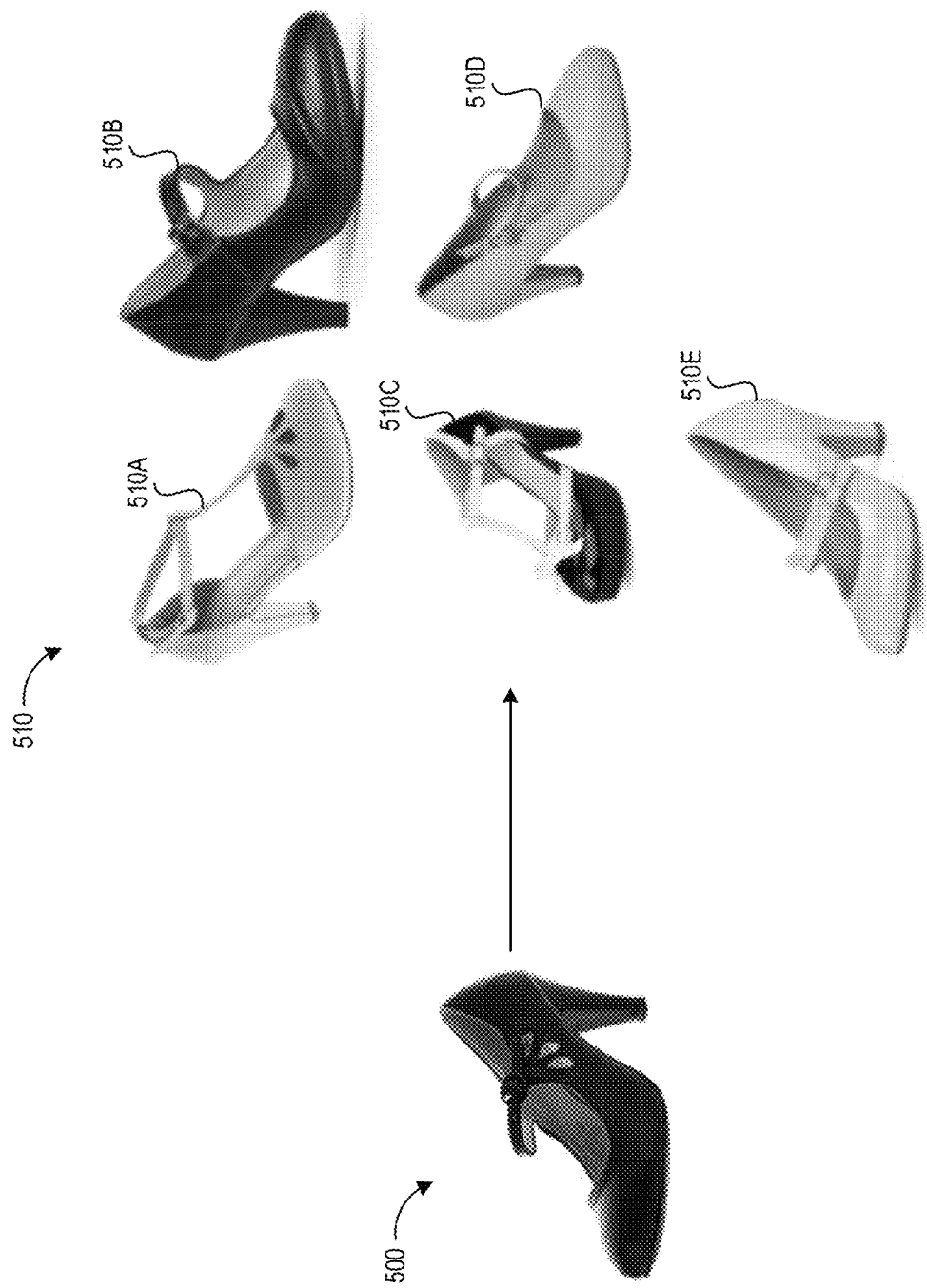
FIGS. 5B-5D illustrate example result sets for the recommendation generation process of FIG. 4.
Figure 5C:
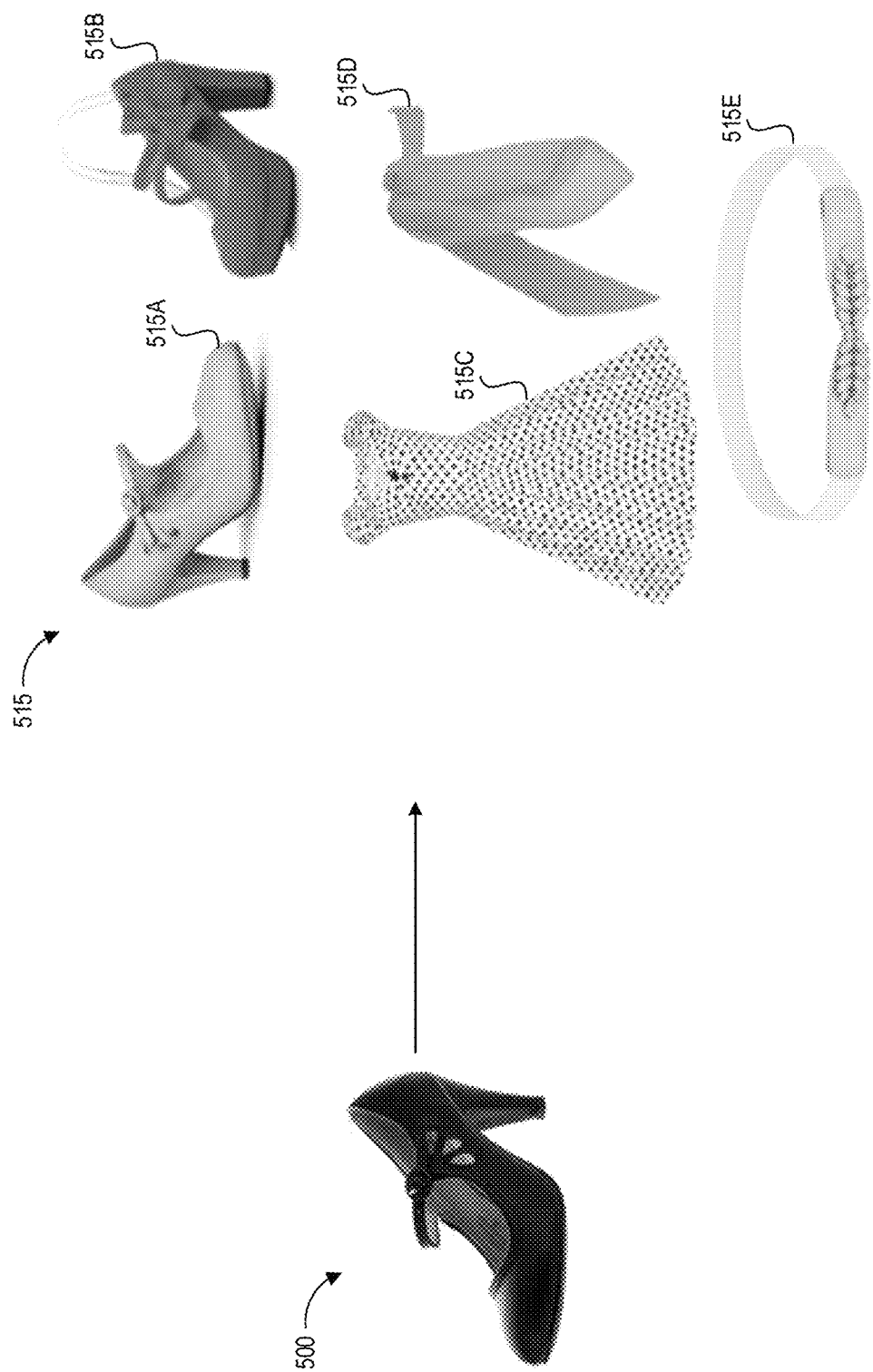
Figure 5D:
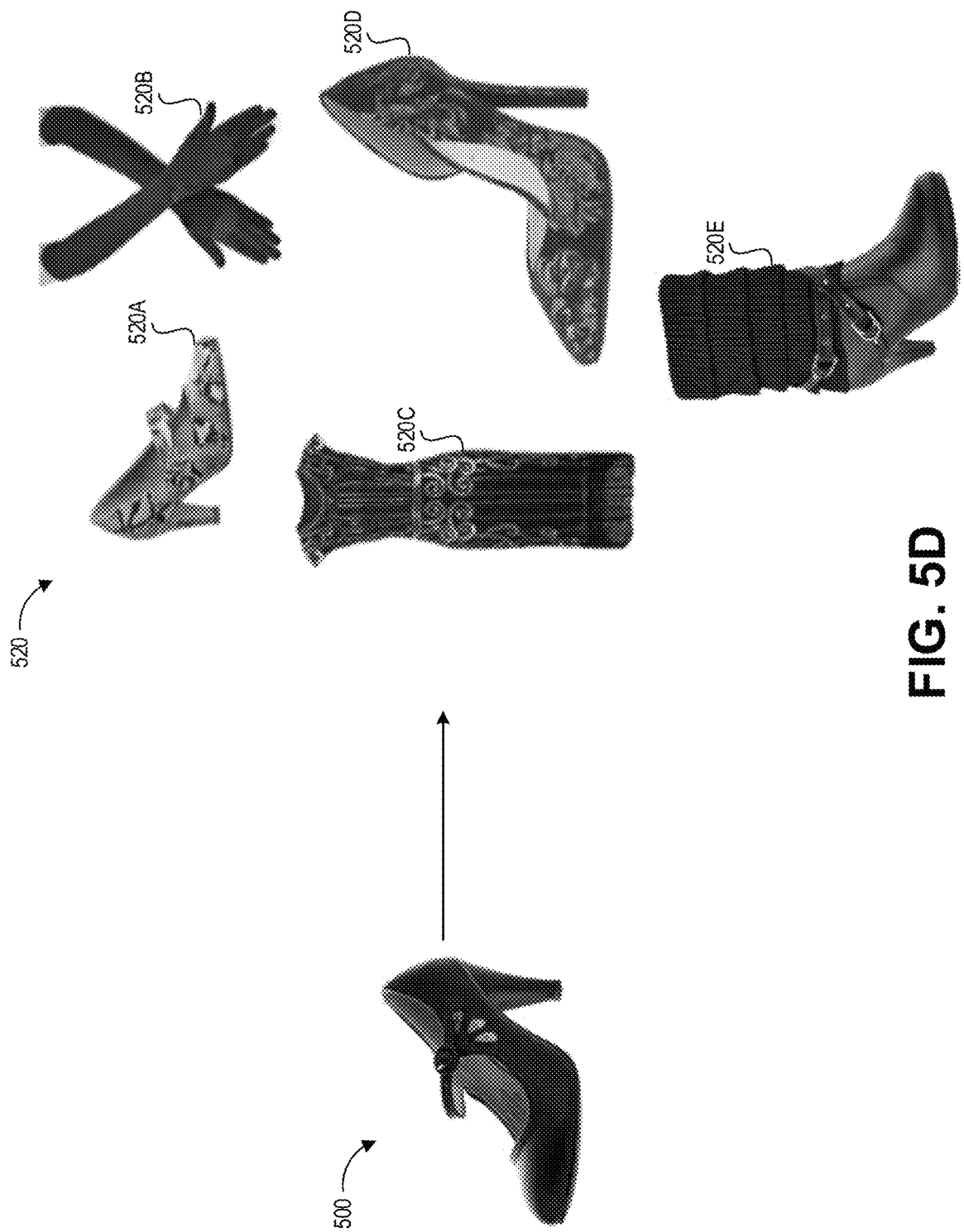

FIGS. 5B-5D illustrate example result sets for the recommendation generation process 400. Specifically, FIG. 5B illustrates an example set of recommended items 510 generated based on a static walk as described with respect to the process 400. In the original color image, shoe 510A is nude/light tan, shoe 510B is black, shoe 510C is black with white accents, shoe 510D is pastel seafoam green, and shoe 510E is offwhite. These items 510A-510E are still relevant to the source item 500, however are more diverse when compared to the similarity-based recommendation set 505, as there are no alternate color variations of the same shoe as the source item 500. However, all of the items 510A-510E are still shoes, and so this recommendations set 510 is not highly diverse.

Turning to FIG. 5C, another example set of recommended items 515 is illustrated for the source item 500. In the original color image, the shoe 515A is pastel pink, shoe 515B is bright red, dress 515C is white with black polka dots, scarf 515D is bright pink, and belt 515E is white with a gold clasp. This recommendations set 515 was generated using the diverse random walk of the process 400, however with no initial bias. As illustrated, the recommendations set 515 includes two types of shoes 515A, 515B, as well as a dress 515C, scarf 515D, and belt 515E that coordinate with the overall style and aesthetic of the shoes. As such, this recommendations set 515 maintains its relevance to the source item 500 while promoting a more exploratory browsing experience for different types of items.

Turning to FIG. 5D, another example set of recommended items 520 is illustrated for the source item 500. In the original color image, the items 510A0520B are primarily black, with shoe 520A additionally including tan with black in a snake-skin pattern. This recommendations set 525 was generated using the diverse random walk of the process 400 with an initial bias towards the color (black) of the source item 500. As illustrated, the recommendations set 515 includes two types of shoes 520A, 520E, as well as a dress 520C, gloves 520B, and a pair of boots 520E. Each of the recommended items 520A-520E is also black (or primarily black) due to the bias towards the source item color, and also includes a diverse set of item types. As such, this recommendations set 520 maintains its relevance to the source item 500 while promoting a more exploratory browsing experience for different types of items, as well as honing in on an attribute-value pair (color=black) in which the user has expressed interest.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by one or more computing devices configured with specific computer-executable instructions,
        accessing a computer representation of a directed graph, the directed graph representing a set of items available in an electronic catalog, wherein the directed graph includes a node for each item from the set of items, and wherein the directed graph includes edges between each pair of nodes that corresponds to a pair of items from the set of items that has been co-accessed by a threshold number of users within a threshold time period;
        identifying a source item of the set of items, the source item represented by a source node of the directed graph;
        calculating, based on a history of interactions between a user and at least some items of the set of items, a bias of the user with respect to an attribute of the at least some items;
        performing a diversified random walk of the directed graph by at least:
            calculating a weight for an edge leading out of the source node to a second node associated with a second item of the set of items, the weight calculated based at least in part on the bias and on a measure of how frequently the source item and second item are co-accessed by users; and taking a step from the source node to the second node based at least partly on the weight;

generating a distribution of nodes visited during the diversified random walk; and generating a recommendation for the user based at least partly on the distribution of nodes.

2. The computer-implemented method of claim 1, wherein the measure of how frequently the source item and second item are co-accessed by users corresponds to a conditional probability that a user who accesses the source item accesses the second item.

3. The computer-implemented method of claim 1, further comprising updating the bias based on attributes associated with the second node.

4. The computer-implemented method of claim 1, further comprising calculating the bias based on a clickstream of pages visited by the user, wherein the history of interactions between the user and the at least some items comprises the clickstream.

5. The computer-implemented method of claim 1, further comprising:

calculating the bias as a positive bias; and selecting a monotone function from among a set of diversified random walk functions based on the bias being a positive bias, wherein the monotone function configures the one or more computing devices to exploit the attribute during the diversified random walk.

6. The computer-implemented method of claim 1, further comprising:

calculating the bias as a negative bias; and selecting a submodular function from among a set of diversified random walk functions based on the bias being a negative bias, wherein the submodular function configures the one or more computing devices to explore the attribute during the diversified random walk.

7. A non-transitory computer-readable medium storing instructions that, when executed, cause a computing system to perform operations comprising:

accessing data representing a graph, wherein the graph includes a node for each item from a set of items, and wherein the graph includes edges between pairs of nodes corresponding to pairs of items from the set of items that have been co-accessed by a threshold number of users;

identifying a source item of the set of items, the source item represented by a source node of the graph;

identifying a bias of a user with respect to an attribute of the at least some items;

performing a diversified random walk of the graph by at least:

calculating a weight for an edge leading out of the source node to a second node associated with a second item of the set of items, the weight calculated based at least in part on the bias and on a measure of how frequently the source item and second item are co-accessed by users; and taking a step from the source node to the second node based at least partly on the weight;

generating a distribution of nodes visited during the diversified random walk; and generating a recommendation for the user based at least partly on the distribution of nodes.

8. The non-transitory computer-readable medium of claim 7, the operations further comprising, at each step of the diversified random walk, iteratively updating the bias based on a histogram of attributes of nodes visited up until that step.

9. The non-transitory computer-readable medium of claim 7, the operations further comprising identifying the bias based on occurrence of the attribute in a purchase history of the user.

10. The non-transitory computer-readable medium of claim 7, the operations further comprising identifying the bias based on a clickstream of the user, the clickstream including a page associated with the source item.

11. The non-transitory computer-readable medium of claim 10, wherein the clickstream also includes another page associated with another item of the set of items, wherein the another page includes a navigational link that, when selected by the user, directed to the user to the page of the source item.

12. The non-transitory computer-readable medium of claim 7, further comprising calculating the weight based additionally on a conditional probability that a user who accesses the source item accesses the second item.

13. The non-transitory computer-readable medium of claim 12, wherein the data representing the graph stores the conditional probability as a weight for the edge, and wherein performing the diversified random walk comprises reweighting the edge based on the conditional probability and the bias.

14. A computing system, comprising:

a memory storing a computer representation of a directed graph, the directed graph representing a set of items available in an electronic catalog, wherein the directed graph includes a node for each item from the set of items, and wherein the directed graph includes edges between each pair of nodes that corresponds to a pair of items from the set of items that has been co-accessed by a threshold number of users within a threshold time period;

one or more processors programmed with executable instructions to at least:

identify a source item of the set of items, the source item represented by a source node of the directed graph;

calculate, based on a history of interactions between a user and at least some items of the set of items, a bias of the user with respect to an attribute of the at least some items;

perform a diversified random walk of the directed graph by at least:

calculating a weight for an edge leading out of the source node to a second node associated with a second item of the set of items, the weight calculated based at least in part on the bias and on a measure of how frequently the source item and second item are co-accessed by users; and taking a step from the source node to the second node based at least partly on the weight;

generate a distribution of nodes visited during the diversified random walk; and generate a recommendation for the user based at least partly on the distribution of nodes.

15. The computing system of claim 14, wherein the measure of how frequently the source item and second item are co-accessed by users corresponds to a conditional probability that a user who accesses the source item accesses the second item.

16. The computing system of claim 14, wherein the one or more processors are further programmed to update the bias based on attributes associated with the second node.

17. The computing system of claim 14, wherein the one or more processors are programmed to calculate the bias based on a clickstream of pages visited by the user, wherein the history of interactions between the user and the at least some items comprises the clickstream.

18. The computing system of claim 14, wherein the one or more processors are further programmed to:
- calculate the bias as a positive bias; and
- select a monotone function from among a set of diversified random walk functions based on the bias being a positive bias, wherein the monotone function configures the one or more processors to exploit the attribute during the diversified random walk.

19. The computing system of claim 14, wherein the one or more processors are further programmed to:
- calculate the bias as a negative bias; and
- select a submodular function from among a set of diversified random walk functions based on the bias being a negative bias, wherein the submodular function configures the one or more processors to explore the attribute during the diversified random walk.

\* \* \* \* \*